[19] United States Patent
Siegmund

[11] 4,190,347
[45] Feb. 26, 1980

[54] LINE ILLUMINATOR

[75] Inventor: Walter P. Siegmund, Woodstock, Conn.

[73] Assignee: American Optical Corporation, Southbridge, Mass.

[21] Appl. No.: 932,750

[22] Filed: Aug. 10, 1978

[51] Int. Cl.² .................. G03B 27/00; G03B 27/54; G03G 15/00
[52] U.S. Cl. .................................. 355/1; 355/11; 355/67
[58] Field of Search .............. 355/50, 132, 40, 1, 355/67, 8, 11, 132; 156/180

[56] References Cited

U.S. PATENT DOCUMENTS

| | | | |
|---|---|---|---|
| 3,148,581 | 9/1964 | Lehmann | 355/11 |
| 3,398,669 | 8/1968 | Hicks | 355/132 X |
| 3,535,036 | 10/1970 | Starkweather | 355/8 X |
| 3,717,531 | 2/1973 | Smith | 156/180 |
| 3,792,964 | 2/1974 | Chatterji | 355/11 X |
| 3,811,770 | 5/1974 | Baus et al. | 355/67 |
| 3,933,556 | 1/1976 | Strack | 156/180 X |
| 3,982,829 | 9/1976 | Hirth | 355/1 |
| 4,070,089 | 1/1978 | Grafton | 355/8 X |

Primary Examiner—Donald A. Griffin
Attorney, Agent, or Firm—Jeremiah J. Duggan; Alan H. Spencer; Stephen A. Schneeberger

[57] ABSTRACT

An illuminator for a line-scanning document copier including a fan-shaped array of optical fibers with light-output ends juxtapositioned along a line, and opposite light-receiving ends tightly bundled together. Light loss from fiber breakage, gaps and other defects inherent in fiber optic arrays cause non-uniform illumination of documents and streaks in the copy. Uniform and high level illumination are accomplished according to this invention with cylindrical light-refracting means placed between the line of fibers and the document to blend emitted light astigmatically.

8 Claims, 4 Drawing Figures

LINE ILLUMINATOR

BACKGROUND OF THE INVENTION

1. Field of the Invention

This invention relates to fiber optics with particular reference to improvements in line illuminators for document copiers.

2. Discussion of the Prior Art

Many document copiers utilize an optical system which scans a line of information over the length (or width) of the document. The thickness of this line may vary from a few to several millimeters.

To obtain maximum efficiency, a means for illuminating only the "line" area of a document is desirable and one method of doing this is to use a fiber optic "fan". This comprises a bundle of optical fibers having their light-output ends juxtapositioned along a line and opposite input ends tightly bundled, e.g. into a circular array which may be illuminated with a tungsten halogen lamp.

A problem with this method has been that irregularities, fiber breakage or gaps in the strip end of the fiber optic fan will cause non-uniform illumination and give rise to streaks on the copy. This can be at least partially overcome by moving the fiber bundle away from the document to "blend" the light, but not without a substantial loss of illumination level.

It is, accordingly, a principal object of this invention to provide both uniformity of illumination and high level illumination in line-scanning systems.

Another object is to accomplish the foregoing simply and economically and further in a manner having compatibility with requirements of various forms of line-scanning document copying systems.

Other objects and advantages of the invention will become more readily apparent from the following description.

SUMMARY OF THE INVENTION

This invention affords both uniformity of illumination and a high level of illumination (low loss) by positioning between a document to be copied and the illuminating "slit" of a line-like array of light-emitting optical fibers, a cylindrical lens (e.g. in the form of a rod of optical glass).

The index of refraction and diameter of the rod are chosen to relay an astigmatic image of the "slit" onto the document at a distance appropriate to the mechanical requirements of the copier system. The use of single and compound cylindrical lenses is also contemplated.

Details of the invention will become more readily apparent from the following description when taken in conjunction with accompanying drawings.

IN THE DRAWINGS

DESCRIPTION OF THE PREFERRED EMBODIMENTS

Figure 1:
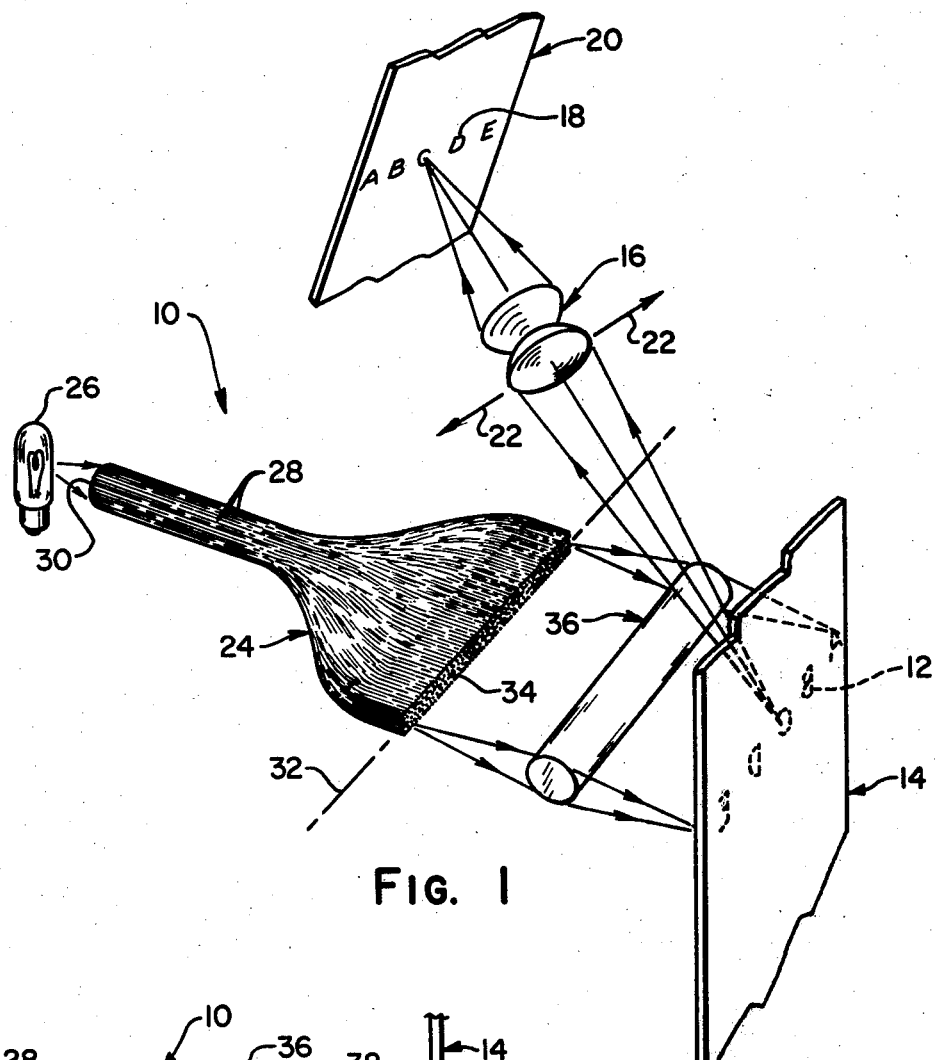
FIG. 1 is a diagrammatic illustration of an exemplary document copying system incorporating an embodiment of the invention.

Referring more particularly to the drawings, FIG. 1 illustrates in schematic fashion, a document copier 10 and a line of information 12 on document 14 to be copied. Document 14 is adapted to be scanned by lens system 16 which images a facsimile 18 of information 12 upon a copy 20. In the illustrated copier apparatus, lens system 16 is caused to scan across document 14 and copy 20 as indicated by arrows 22.

In order to produce facsimile 18, information 12 requires illumination which may be provided with fiber optic bundle 24 and light source 26, e.g. a tungsten halogen lamp. Fiber optic bundle 24 comprises an assembly of light-conducting fibers arranged in a fan-like configuration with light-receiving ends thereof tightly grouped together as receiving face 30 and light-emitting ends juxtapositioned along a line 32 to form a long and slender light-emitting face or "slit" 34. This light-emitting face may comprise one or a plurality of layers of light-emitting ends of fibers 28. Those interested in greater details of the construction of fan-like arrays of optical fibers may refer to U.S. Pat. Nos. 3,717,531 and 3,933,556. These patents illustrate structures having line-like ends of single fiber thicknesses.

The placing of a light-emitting face such as face 34 of bundle 24 immediately against a document to be copied may afford a maximum intensity of illumination of the document but create a tendency to streak the copy as a result of unavoidable fiber breakage or gaps in the light-emitting end of the fiber bundle which produce non-uniform illumination. On the other hand, moving the fiber optic light-emitting face away from the document to be copied may tend to "blend" the emitted light and reduce streaks in the copy but the attendant loss of illumination level becomes critical.

Figure 2:
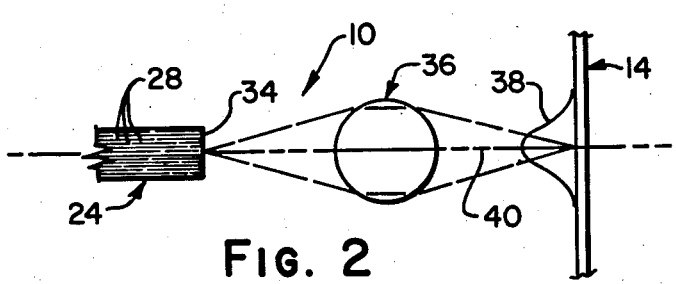
FIG. 2 is an enlarged fragmentary side view of the system of FIG. 1 wherein there is graphically illustrated the special feature of projecting uniformly blended high intensity light upon a document to be copied.

In order to provide both uniformity and high level of illumination according to the present invention, light-emitting face 34 of fiber optic bundle 24 is spaced a substantial distance away from document 14 but with cylindrical lens 36 interposed between face 34 and document 14. Thus, high level illumination is obtained without obscuring information 12 with respect to lens system 16. More particularly, the incident astigmatic image of the "slit" of light blends dark spots resulting from gaps, fiber breakage and other such defects in fiber bundle 24. A side elevation of the system using cylindrical lens 36 is shown in FIG. 2 wherein line 38 graphically represents the blending of light directed upon document 14. The light peaks in intensity at axis 40 of the system.

As in the usual case of all lens design, the index of refraction and diameter of lens 36 (a rod of glass or other transparent lens material such as allyl diglycol carbonate) are chosen according to the size and relative position of image copier components so as to relay the astigmatic image of the slit a distance appropriate to the mechanical requirements of the system.

Figure 3:
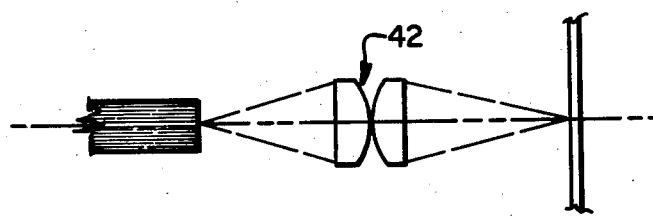
FIG. 3 is a fragmentary side elevational view of a modification of the invention.
Figure 4:
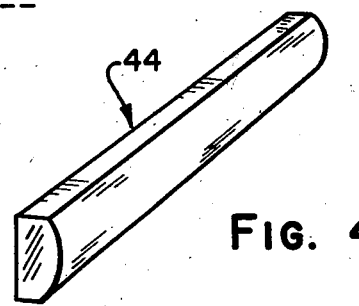
FIG. 4 is an illustration, in perspective, of a form of light-refracting component also applicable to the invention.

While the completely cylindrical rod-like form of lens 36 represents a preferred embodiment of the invention, it should be understood that other cylindrical lens configurations may be used. For example, a dual cylindrical lens objective 42 (FIG. 3) may be used in place of lens 36. Also, it is contemplated that a single plano-convex cylindrical lens 44 (FIG. 4) may be required or desirable in particular image-copying systems.

Those skilled in the art will readily appreciate that various other modifications and adaptations of the precise forms of the invention here shown may be made to suit particular requirements. It is accordingly intended that all modifications which incorporate the novel concept disclosed are to be construed as coming within the scope of the claims or the range of equivalency to which they are entitled.

I claim:

1. An illuminator comprising the combination of:
   a bundle of light-conducting fibers having light-receiving and light-emitting opposite ends, said light-receiving ends of said fibers being tightly grouped together in a generally circular array and said light-emitting ends being juxtapositioned along a straight line, said line of light-emitting ends being continuous and of at least one fiber diameter in thickness;
   a source of light adjacent said light-receiving ends of said fibers for directing light thereinto; and
   cylindrical lens means extending substantially parallel to said line of fibers in directly forwardly spaced relationship therewith, said lens means having light-receiving and light-emitting opposite sides affording astigmatic imaging of said line of light-emitting fiber ends for blending of irregularities of light intensities emitted from said line of fiber ends.

2. An illuminator according to claim 1 wherein said cylindrical lens means is of a circular cross-sectional shape.

3. An illuminator according to claim 1 wherein said cylindrical lens means comprises a component having a plano-convex cross-sectional shape.

4. An illuminator according to claim 3 wherein said cylindrical lens means includes a second adjacent plano-convex component.

5. In an illuminator for a linescanning document copier including a light source, a bundle of light-conducting fibers having light-receiving ends tightly grouped in a generally circular array adjacent said light source and light-emitting fiber ends juxtapositioned along a straight line spaced from a document to be copies; the improvement comprising:
   cylindrical lens means in said space between said light-emitting ends of said fibers and said document, said cylindrical lens means being in directly forwardly spaced relationship from said line of light-emitting fiber ends and extending approximately parallel to said line, said lens means having light-receiving and light-emitting opposite sides affording astigmatic imaging of said line of light-emitting fiber ends for blending of irregularities of light intensities emitted from said line of fiber ends.

6. The improvement in an illuminator according to claim 5 wherein said cylindrical lens means comprises a single component of circular cross-sectional configuration.

7. The improvement in an illuminator according to claim 5 wherein said cylindrical lens means comprises a single component of plano-convex cross-sectional shape.

8. The improvement in an illuminator according to claim 5 wherein said cylindrical lens means comprises a pair of parallel lens components of plano-convex cross-sectional shape.

* * * * *